(12) United States Patent
Borsoi et al.

(10) Patent No.: US 11,852,900 B2
(45) Date of Patent: Dec. 26, 2023

(54) EYEGLASSES WITH AUDIO PLAYBACK FUNCTION

(71) Applicant: LUXOTTICA S.R.L., Agordo (IT)

(72) Inventors: Fabio Borsoi, Vittorio Veneto (IT); Valerio Oliana, Tione di Trento (IT)

(73) Assignee: LUXOTTICA S.R.L., Agordo (IT)

( * ) Notice: Subject to any disclaimer, the term of this patent is extended or adjusted under 35 U.S.C. 154(b) by 90 days.

(21) Appl. No.: 17/312,631

(22) PCT Filed: Dec. 14, 2018

(86) PCT No.: PCT/IB2018/060105
§ 371 (c)(1),
(2) Date: Jun. 10, 2021

(87) PCT Pub. No.: WO2020/121048
PCT Pub. Date: Jun. 18, 2020

(65) Prior Publication Data
US 2022/0019092 A1 Jan. 20, 2022

(51) Int. Cl.
*G02C 11/00* (2006.01)
*G02C 5/14* (2006.01)
(Continued)

(52) U.S. Cl.
CPC ............... *G02C 11/10* (2013.01); *G02C 5/14* (2013.01); *H04R 1/105* (2013.01); *H04R 5/0335* (2013.01); *H04R 2420/07* (2013.01)

(58) Field of Classification Search
CPC .......... G02C 11/10; G02C 5/14; H04R 1/105; H04R 5/0335; H04R 2420/07
See application file for complete search history.

(56) References Cited

U.S. PATENT DOCUMENTS

2012/0028613 A1* 2/2012 Lewis ............... H04M 1/72433
381/104
2012/0328134 A1* 12/2012 Lewis ................. G02C 11/10
381/386

(Continued)

FOREIGN PATENT DOCUMENTS

CN 202102188 U 1/2012
CN 102792713 A 11/2012
(Continued)

OTHER PUBLICATIONS

Amft Oliver et al, "Making Regular Eyeglasses Smart", Jul. 1, 2015 (Jul. 1, 2015), vol. 14, No. 3, p. 32-43, XP011662334.
(Continued)

*Primary Examiner* — Sean H Nguyen
(74) *Attorney, Agent, or Firm* — CANTOR COLBURN LLP

(57) ABSTRACT

Eyeglasses with audio playback function include a front body adapted to retain at least one lens and includes first and second lateral ends to which respectively a first temple and a second temple for fixing the eyeglasses to the head of the user are connected. The eyeglasses also include electronic components, which include at least one audio driver. The eyeglasses are configurable at least in an open condition, which allows the eyeglasses to be worn by the user and in which the first temple and the second temple are arranged (Continued)

substantially parallel to each other and at right angles to the front body. The electronic components are accommodated exclusively inside the two temples.

12 Claims, 2 Drawing Sheets

(51) Int. Cl.
*H04R 1/10* (2006.01)
*H04R 5/033* (2006.01)

(56) References Cited

U.S. PATENT DOCUMENTS

| | | | |
|---|---|---|---|
| 2013/0316642 A1 | 11/2013 | Newham | |
| 2014/0253867 A1* | 9/2014 | Jiang | G02C 11/10 351/158 |
| 2018/0212314 A1* | 7/2018 | Rautio | G02C 5/22 |
| 2019/0238971 A1* | 8/2019 | Wakeland | H04R 1/347 |

FOREIGN PATENT DOCUMENTS

| | | |
|---|---|---|
| CN | 205490516 U | 8/2016 |
| CN | 105938248 A | 9/2016 |
| CN | 106125343 A | 11/2016 |
| CN | 106937197 A | 7/2017 |
| CN | 108513196 A | 9/2018 |
| CN | 108702651 A | 10/2018 |
| JP | 2009180863 A | 8/2009 |
| JP | 2010521853 A | 6/2010 |
| JP | 2013513275 A | 4/2013 |
| JP | 2016039632 A | 3/2016 |
| JP | 2018056698 A | 4/2018 |

OTHER PUBLICATIONS

Anonymous, "ICE Theia Glares—Wearable Video Camera Glasses", Jun. 27, 2017 (Jun. 27, 2017), Retrieved from the Internet: URL:https://www.amazon.com/dp/B0154P59JW; XP055611523.

International Search Report dated Aug. 22, 2019 re: Application No. PCT/IB2018/060105, pp. 1-4, citing: Anonymous "ICE Theia Glares . . . ", TeQreation "ICE Theia Glares . . . ", US 2014/0253867 A1, US 2012/0328134 A1 and Oliver et al. "Making Regular Eyeglasses Smart . . . ".

TeQreation, "ICE Theia Glares—Wearable Video Camera Glasses w/ Bluetooth Headset", Dec. 16, 2015 (Dec. 16, 2015), p. 1-7, Retrieved from the Internet: URL:https://www.youtube.com/watch?v=TyGOHNn6RRw; XP054979590.

Written Opinion dated Aug. 22, 2019 re: Application No. PCT/IB2018/060105, pp. 1-7, citing: Anonymous "ICE Theia Glares . . . ", TeQreation "ICE Theia Glares . . . ", US 2014/0253867 A1, US 2012/0328134 A1 and Oliver et al. "Making Regular Eyeglasses Smart . . . ".

JP Office Action dated Oct. 27, 2022 re: Application No. 2021-533268, pp. 1-25, citing: JP 2018-056698 A, JP 2010-521853 A, JP 2013-513275 A, JP 2016-039632 A, JP 2009-180863 A, US 2018/0212314 A1 and CN 2015490516 A.

Japanese Office Action for Japanese Application No. 2021-533268, dated Apr. 14, 2023, 13 pages with translation.

Chinese First Office Action for Chinese Application No. 2018801001243, dated Jan. 31, 2023, 18 pages with translation.

Chinese Office Action for Chinese Application No. 2018801001243, dated Aug. 28, 2023, 11 pages with translation.

Brazilian Office Action for Brazilian Application No. BR112021010822-0, dated Sep. 25, 2023, 9 pages with translation.

\* cited by examiner

EYEGLASSES WITH AUDIO PLAYBACK FUNCTION

TECHNICAL FIELD

The present disclosure relates to eyeglasses with audio playback function.

More particularly, the disclosure relates to electronic eyeglasses particularly but not exclusively useful and practical in the fashion field.

BACKGROUND

As is known, eyeglasses are devices which primarily perform the function of protecting the eyes of the user from the rays of the sun and/or of correcting eyesight disorders by means of appropriate lenses.

This main function is now accompanied by the function of aesthetic and design accessory that follows the trends of the fashion industry, which today is no less important from the commercial standpoint.

Eyeglasses are normally constituted by a front body which accommodates the lenses and by two temples which allow the user to wear them, placing them on the temples of the head so that they rest on the ears.

The front body is the element that mainly characterizes the aesthetic appearance of the eyeglasses and can assume various shapes and dimensions. In particular, in the fashion industry, where the design element is predominant, the range varies from eyeglasses with very large and conspicuous front bodies, sometimes having unusual shapes, to eyeglasses in which the front body is very simple and thin.

Particular eyeglasses known as electronic eyeglasses have recently been developed, i.e., eyeglasses which comprise electronic components and which associate with the main function of the eyeglasses additional functions which are commonly performed by other devices, such as for example playing music, answering the telephone, taking videos or photographs, acquiring physiological parameters, detecting environmental parameters, etc.

One particular type of electronic eyeglasses is constituted by eyeglasses that allow the playback of music or audio in general by means of audio drivers integrated therein.

In these eyeglasses, which can be stereo, in addition to the audio drivers, normally there are other electronic components, such as for example microchips, displays, charge generators, batteries, connectors, data storage means, etc.

According to the prior art, the electronic components are normally distributed in all the parts of the eyeglasses, i.e., both inside the front body and inside the temples.

In general, in eyeglasses, whether stereo or non-stereo, of the known type, at least part of the electronics is accommodated inside the front body, in particular the wiring for carrying signals or charge supply.

Furthermore, in eyeglasses of the known type, the electronic components that are present in the two temples are different and perform different workloads and therefore have different energy consumptions.

In these eyeglasses, therefore, the dimensions, design and aesthetic appearance are heavily influenced by the presence of the electronic components. In particular, the front body must have dimensions and a shape suitable to allow the correct operation of the electronic part.

These limitations make electronic eyeglasses of the known type scarcely suitable for use in the fashion industry, where, as already noted, there is a strong need to have eyeglasses having the most disparate shapes and dimensions.

Furthermore, again in the fashion sector, the same manufacturer commonly has to modify the design of his products very rapidly and this entails, for stereo eyeglasses of the known type, the need to redesign the electronic part every time there is a design change and for every model of eyeglasses, with the obvious disadvantages in terms of costs and times.

Another drawback of eyeglasses of the known type resides in that the presence of the electronic components makes the eyeglasses scarcely balanced, causing imbalances to the full detriment of wearing comfort. In particular, eyeglasses of the known type often have a weight that is imbalanced toward the front body or toward a single temple.

Furthermore, the fact that the temples have a different energy consumption leads, if the temples are independently powered each by a battery, to the early depletion of one of the two batteries. In order to obviate this drawback, in stereo eyeglasses of the background art sometimes a single battery body is sometimes used that supplies power to both temples and is accommodated in the front body together with the various wiring, with a consequent further increase in weight and increase in dimensions of said front body.

SUMMARY

The aim of the present disclosure is to overcome the limitations of the background art described above, devising eyeglasses that can offer audio playback and at the same time can be adapted for use in the field of fashion, offering great flexibility in design as regards shapes and dimensions.

Within this aim, the present disclosure provides eyeglasses in which the aesthetic design can be modified without having to redesign the electronic part.

The disclosure also provides eyeglasses that avoid the early depletion of one battery with respect to the other.

The disclosure further provides eyeglasses that are balanced and comfortable to wear.

The disclosure also provides eyeglasses that are easy to provide and economically competitive if compared with the background art.

This aim, these advantages and others which will become better apparent hereinafter are achieved by providing eyeglasses with audio playback function, comprising:
- a front body adapted to retain at least one lens and comprising a first lateral end and a second lateral end to which respectively a first temple and a second temple for fixing the eyeglasses to the head of the user are connected;
- a plurality of electronic components, which include at least one audio driver;
- said eyeglasses being configurable at least in an open condition, which allows the eyeglasses to be worn by the user and in which the first temple and the second temple are arranged substantially parallel to each other and at right angles to the front body, characterized in that said electronic components are accommodated exclusively inside said two temples.

BRIEF DESCRIPTION OF THE DRAWINGS

Further characteristics and advantages will become better apparent from the description of a preferred but not exclusive embodiment of a pair of stereo eyeglasses, illustrated by way of nonlimiting example with the aid of the accompanying drawings, wherein.

DETAILED DESCRIPTION OF THE DRAWINGS

Figure 1:
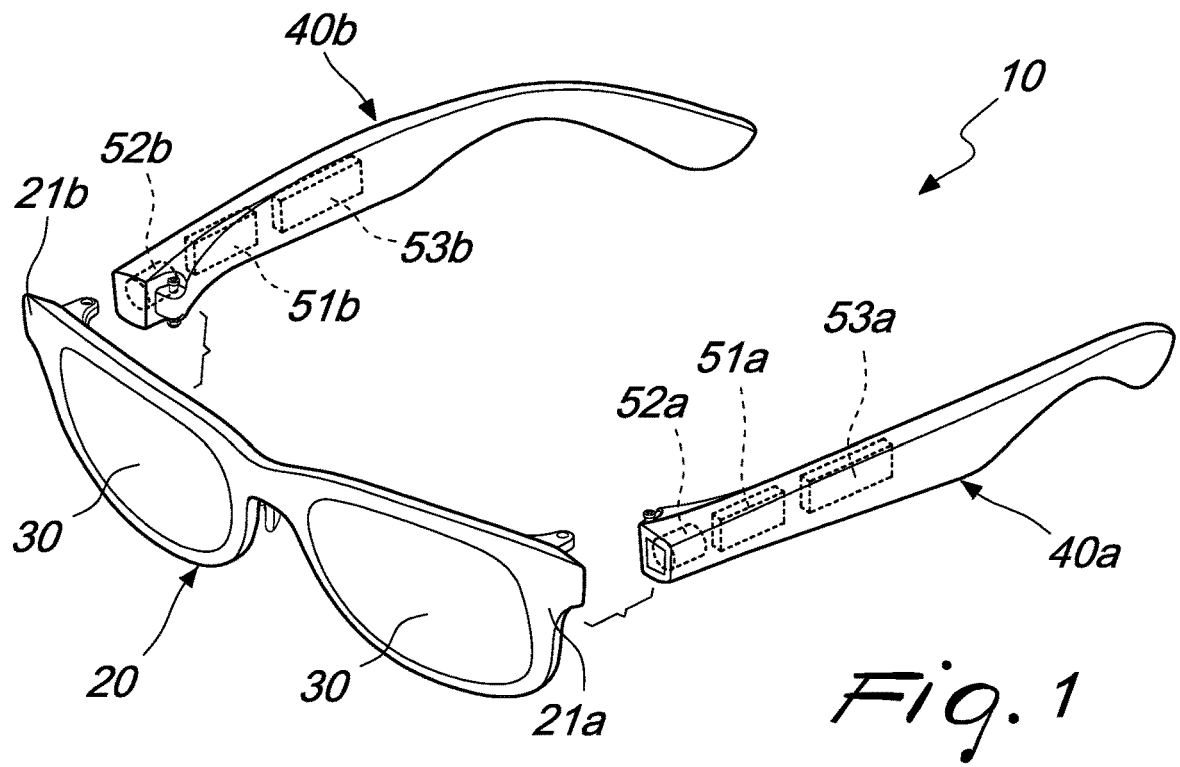
FIG. 1 is a perspective view of a possible embodiment of the eyeglasses according to the disclosure, with the temples detached from the front body.

With reference to the figures, the eyeglasses according to the disclosure, designated generally by the reference numeral 10, comprise a front body 20 adapted to retain at least one lens 30 and comprising a first lateral end 21a and a second lateral end 21b, to which a first temple 40a and a single second temple 40b are respectively connected for the fixing of the eyeglasses 10 to the head of the user.

The front body 20, as will become better apparent hereinafter, can have any shape and dimensions, depending on the requirements and the design choices.

The lenses 30 are preferably two, one for each eye, but it is also possible to provide eyeglasses according to the disclosure which are characterized by a single contoured lens that covers both eyes.

Furthermore, the lenses 30 can be of any type known in the art, both protective lenses and corrective lenses.

In the illustrated examples, the temples 40a, 40b are of the type commonly used in commercially available eyeglasses, i.e., characterized by a proximal portion, adjacent to the front body, that is substantially rectilinear and a distal portion which is slightly arc-like in order to be rested comfortably on the ears. However, according to the disclosure, it is also possible to use temples having a more unusual shape.

The temples 40a, 40b are connected to the two lateral ends 21a, 21b of the front body 20 by means of one of the known methods, such as for example the use of hinges which allow the temples 40a, 40b to rotate through 90° and pass from an open position to a folded position.

The eyeglasses therefore can be configured at least in an open condition, which allows the eyeglasses to be worn by the user and in which the temples 40a, 40b are arranged substantially parallel to each other and perpendicular to the front body 20, and preferably also in a closed condition, in which the temples 40a, 40b are folded and substantially parallel to the front body 20.

According to an optional and advantageous characteristic, the temples 40a, 40b are connected to the front body 20 so that they can be easily connected and disconnected, so as to allow the user easy replacement of the temples 40a, 40b and/or of the front body 20.

The eyeglasses furthermore comprise a plurality of electronic component 51a, 51b, 52a, 52b, 53a, 53b, including at least one audio driver 53a, 53b.

The audio drivers 53a, 53b can be of any type known in the art, such as for example ordinary loudspeakers or piezoelectric drivers that use the walls and the internal structure of the temples 40a, 40b as a speaker enclosure.

Preferably, the audio drivers 53a, 53b are a pair of drivers or a group of drivers of the stereo type. The drivers can also be for example three for each temple, two tweeters and one woofer.

The eyeglasses according to the disclosure furthermore comprise, although they are not illustrated in the figures, the electronic components which in the background art are required at least for the operation of the audio drivers 53a, 53b, such as for example one or more voltage sources 51a, 51b, preferably constituted by rechargeable batteries, audio amplifiers and microchips or means for the electrical connection of the electronic components 51a, 51b, 52a, 52b, 53a, 53b.

The eyeglasses 10 according to the disclosure can optionally also comprise other electronic components for the implementation of additional functions, such as for example connectors, data storage means, displays, transmission means, etc.

According to the disclosure, the front body 20 is free from electronic components, since the electronic components 51a, 51b, 52a, 52b, 53a, 53b are accommodated exclusively inside the two temples 40a, 40b.

In practice, according to the disclosure, all the electronic components 51a, 51b, 52a, 52b, 53a, 53b are arranged inside the temples 40a, 40b.

In this manner, the front body 20 is completely free from the constructive constraints dictated by the presence of the electronic components 51a, 51b, 52a, 52b, 53a, 53b and can thus be provided in the most disparate shapes and dimensions. Furthermore, the absence of electronic components 51a, 51b, 52a, 52b, 53a, 53b in the front body 20 has the advantage of avoiding the imbalance of the eyeglasses 10 toward the front part.

Preferably, at least one audio driver 53a, 53b and at least one voltage source 51a, 5 lb are accommodated inside each temple 40a, 40b.

Advantageously, the audio drivers 53a, 53b are arranged in the portion of the temple 40a, 40b which, when the eyeglasses 10 are worn, is adjacent to the ear of the user.

The electronic components can be arranged within one or more cavities appropriately provided in the temples 40a, 40b or directly integrated in said temples, depending on the constructive choices.

Advantageously, the two temples 40a, 40b have substantially the same weight and the same volume.

This result can be achieved, for example, by inserting asymmetric decorative elements in the temple, such as for example logos and/or decorations, or by using materials having a different density, such as for example polymers with different fillers or balancing elements specifically designed to compensate any imbalances.

As an alternative, if the electronic components weigh less than the plastic material that surrounds them, it may be necessary to provide appropriate voids.

In this manner, the eyeglasses 10 are free from imbalances that can influence correct fit.

Preferably, at least one wireless transmission and/or reception means 52a, 52b is also accommodated inside each one of the two temples 40a, 40b, said wireless transmission and/or reception means 52a, 52b allowing at least the communication between said two temples 40a, 40b.

The communication between the two temples includes at least in the exchange of an audio signal in digital or analog format.

Advantageously, this communication occurs in such a manner as to allow the distribution of the audio signal on various synchronized channels.

Preferably, one temple 40*a* performs the master function and the other one 40*b* performs the slave function.

Advantageously, the eyeglasses 10 according to the disclosure can also comprise one or more microphones.

In the preferred and illustrated embodiment, at least one of the temples 40*a*, 40*b* is capable of communicating with an external source device S, such as for example a smartphone or an audio playback device provided with wireless technology or a tablet, by virtue of said wireless transmission and/or reception means 52*a*, 52*b*.

The communication between the external source device S and at least one temple 40*a*, 40*b* includes at least in the exchange of an audio signal in digital format.

Advantageously, this communication occurs in such a manner as to allow the distribution of the audio signal on various synchronized channels.

Figure 2:
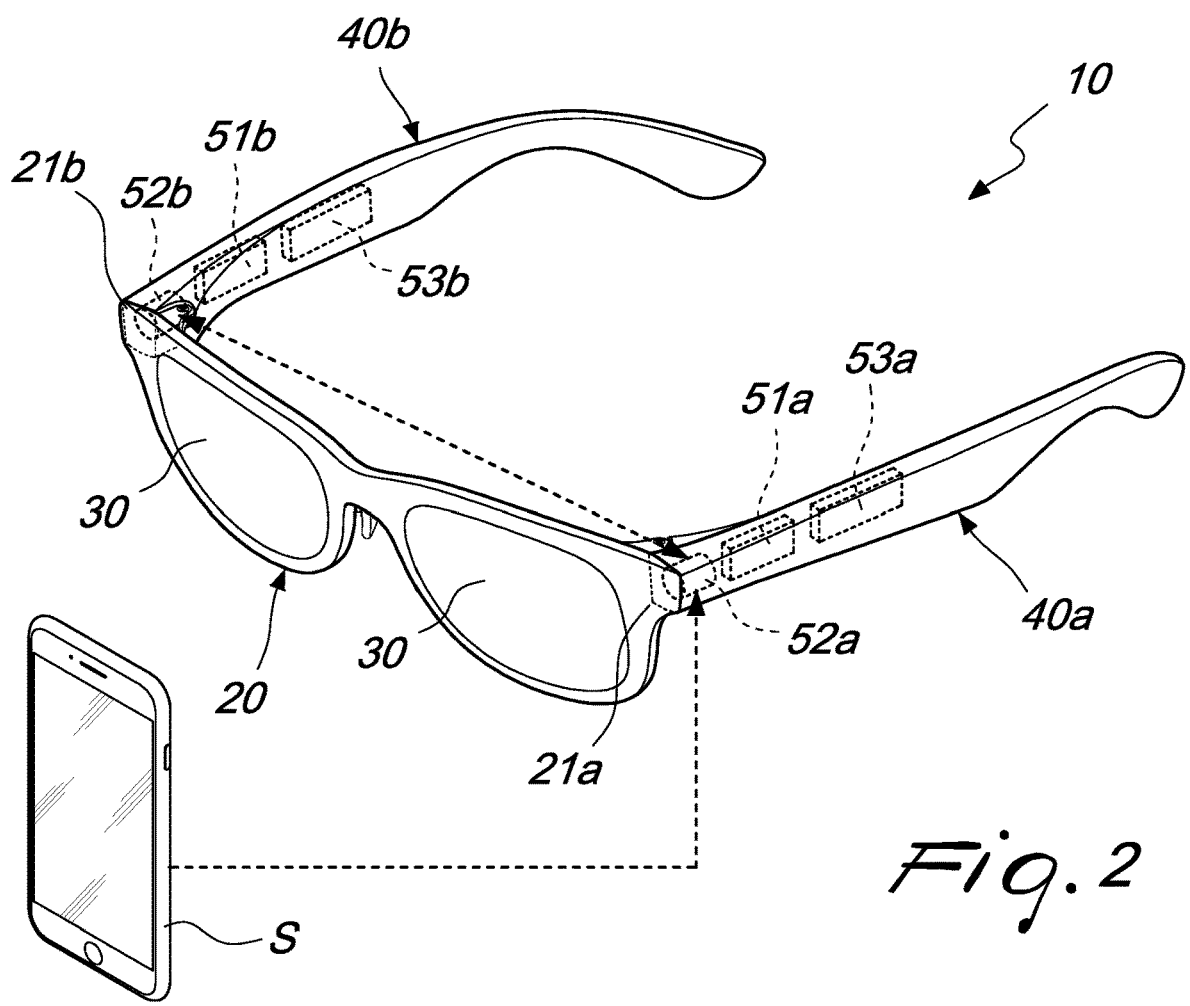
FIG. 2 is a perspective view of a first possible embodiment of the eyeglasses according to the disclosure, associated with an external source device.
Figure 3:
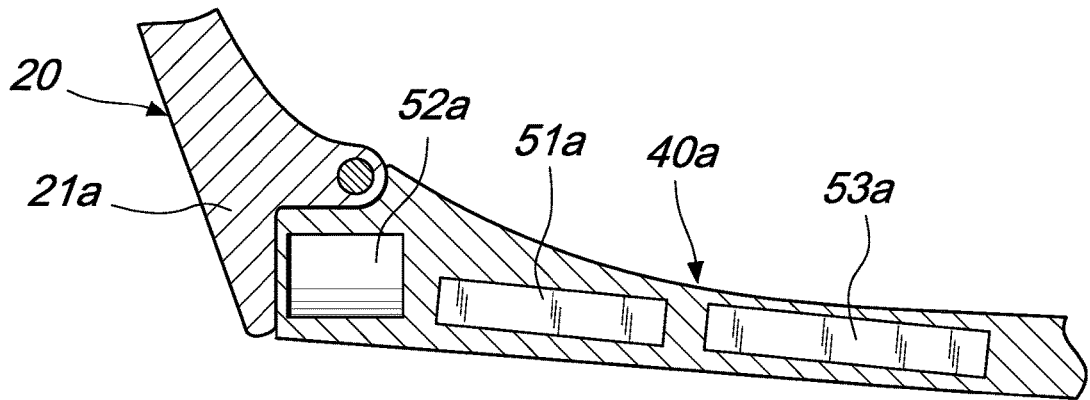
FIG. 3 is a sectional top view of the portion of the temple that accommodates the electronic components of the eyeglasses according to the disclosure.

In the first possible embodiment, shown in FIG. 2, the external source device S communicates with the first temple 40*a*, which in turn communicates with the second temple 40*b*.

In practice, in this first embodiment, the audio signal is transmitted from the external source device S to the first temple 40*a* and from there to the second temple 40*b*.

Figure 4:
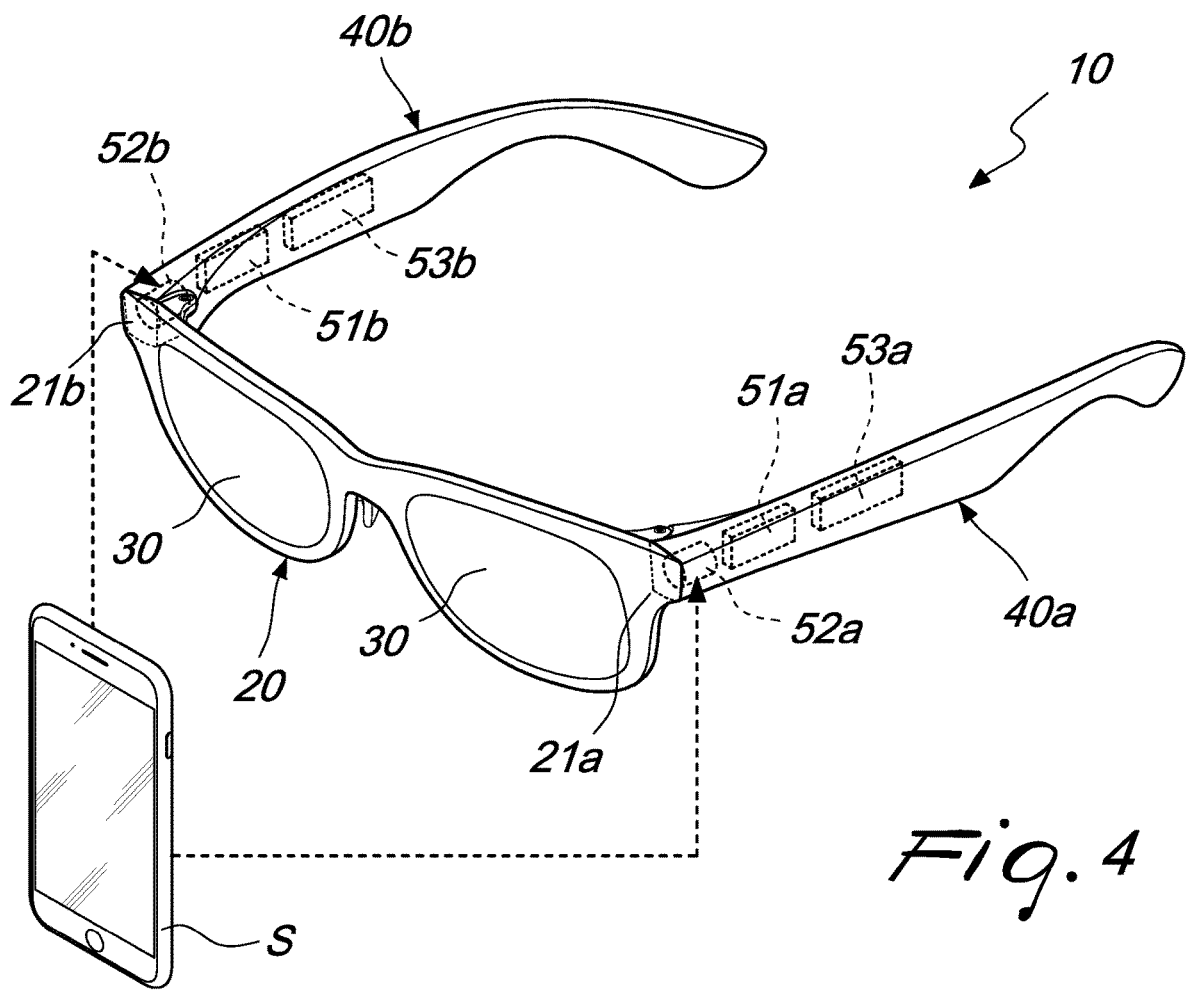
FIG. 4 is a perspective view of a second possible embodiment of the eyeglasses according to the disclosure, associated with an external source device.

In a possible second embodiment, shown in FIG. 4, each one of the two temples 40*a*, 40*b* is capable of communicating independently with an external source device S by means of said at least one wireless transmission and/or reception means 52*a*, 52*b*.

Advantageously, in this second embodiment, the independent communications between the external source device S and each temple 40*a*, 40*b* includes at least in the exchange of an audio signal in digital format.

Advantageously, these communications occur in such a manner as to allow the distribution of the audio signal on various synchronized channels.

Preferably, the external source device S also has a telephone function, being preferably a smartphone.

In this case, the eyeglasses 10 according to the disclosure allow at least to answer telephone calls received by said external source device S by means of one of the technical solutions that are well-known in the field.

According to an optional and advantageous characteristic, the electronic components 51*a*, 51*b*, 52*a*, 52*b*, 53*a*, 53*b* are distributed between the two temples 40*a*, 40*b* so that the energy consumption of the two temples 40*a*, 40*b* is substantially equivalent.

In practice, the electronic components 51*a*, 51*b*, 52*a*, 52*b*, 53*a*, 53*b*, comprising the ones not shown, are distributed between the first temple 40*a* and the second temple 40*b* so that the sum of the energy consumptions of the electronic components 51*a*, 52*a*, 53*a* (comprising the ones not shown) accommodated in the first temple is substantially equal to the sum of the energy consumptions of the electronic components 51*b*, 52*b*, 53*b* (comprising the ones not shown) accommodated in the second temple 40*b*.

The expression "energy consumption of a temple" 40*a* (or 40*b*) is in fact understood as the sum of the electric power consumptions of all the electronic components 51*a*, 52*a*, 53*a* (or 51*b*, 52*b*, 53*b*) accommodated on said temple 40*a* (or 40*b*).

In this manner, one prevents one of the temples 40*a*, 40*b*, which are preferably each supplied by an independent battery, from depleting its charge early with respect to the other one.

As an alternative or in addition to the technical solution described previously, the eyeglasses 10 according to the disclosure can comprise a computer system which manages the operation of the electronic components 51*a*, 51*b*, 52*a*, 52*b*, 53*a*, 53*b* so that the energy consumption of the two temples 40*a*, 40*b* is substantially equivalent. For example, it is possible to distribute the workload in a different manner depending on the use case, for example mono in case of a phone call or stereo in case of music.

Such computer system is constituted for example by software which, by means of an electronic device that controls the operation of at least part of the electronic components, regulates the work of the electronic components 51*a*, 51*b*, 52*a*, 52*b*, 53*a*, 53*b* so that the total electrical consumption of the electronic components 51*a*, 52*a*, 53*a* accommodated in the first temple 40*a* is substantially equivalent to the total electrical consumption of the electronic components 51*b*, 52*b*, 53*b* accommodated in the second temple 40*b*.

Again in order to obtain a substantially equivalent energy consumption of the two temples 40*a*, 40*b*, each temple 40*a*, 40*b* can accommodate additional electronic components which can be activated when needed.

In practice it has been found that the eyeglasses according to the present disclosure achieve the intended aim and objects, since they are suitable for use in the field of fashion, offering broad flexibility in design as regards shapes and dimensions.

Another advantage of the eyeglasses according to the disclosure resides in that they allow to change the aesthetic design without having to redesign the electronic part.

A further advantage of the eyeglasses according to the disclosure resides in that they can have a light front body having any shape.

Another advantage of the eyeglasses according to the disclosure resides in that they avoid the early depletion of one of the batteries.

Another advantage of the eyeglasses according to the disclosure resides in that they are balanced and comfortable to wear.

A further advantage of the eyeglasses according to the disclosure resides in that they are easy to provide and economically competitive if compared with the background art.

The eyeglasses thus conceived are susceptible of numerous modifications and variations, all of which are within the scope of the appended claims.

All the details may furthermore be replaced with other technically equivalent elements.

In practice, the materials used, so long as they are compatible with the specific use, as well as the contingent shapes and dimensions, may be any according to the requirements and the state of the art.

To conclude, the scope of the protection of the claims must not be limited by the illustrations or preferred embodiments shown in the description by way of example, but rather the claims must comprise all the characteristics of patentable novelty that reside in the present disclosure, including all the characteristics that would be treated as equivalents by the person skilled in the art.

The invention claimed is:

1. Eyeglasses with audio playback function comprising:
    a front body adapted to retain at least one lens and comprising a first lateral end and a second lateral end to which respectively a first temple and a second temple for fixing the eyeglasses to the head of a user are connected; and
    a plurality of electronic components, which include at least one audio driver; said eyeglasses being configurable at least in an open condition, which allows the eyeglasses to be worn by the user and in which the first temple and the second temple are arranged substantially parallel to each other and at right angles to the front body, wherein said electronic components are accommodated exclusively inside said two temples, wherein the electronic components are distributed between the two temples so that an energy consumption of the two temples is substantially equivalent, and further comprising a computer system which manages the work of the electronic components so that an energy consumption of the two temples is substantially equivalent.

2. The eyeglasses according to claim 1, wherein at least one audio driver and at least one voltage source are accommodated inside each one of said temples.

3. The eyeglasses according to claim 2, wherein said at least one audio driver is a pair of stereo drivers and communications between the two temples and/or between at least one temple and the external source device occur so as to allow the distribution of an audio signal on various synchronized channels.

4. The eyeglasses according to claim 1, wherein at least one wireless transmission and/or reception means is also accommodated inside each one of said temples, said at least one wireless transmission and/or reception means allowing at least communication between said two temples.

5. The eyeglasses according to claim 4, wherein at least one of said two temples is capable of communicating with an external source device by said wireless transmission and/or reception means.

6. The eyeglasses according to claim 5, wherein each one of said two temples is capable of communicating independently with an external source device by said at least one wireless transmission and/or reception means.

7. The eyeglasses according to claim 5, wherein the external source device also acts as a telephone, said eyeglasses allowing at least to answer telephone calls received by said external source device.

8. The eyeglasses according to claim 1, further comprising at least one microphone.

9. Temples for eyeglasses comprising: a plurality of electronic components, among which at least one audio driver, which are accommodated within said temples, wherein the electronic components are distributed between said temples so that an energy consumption of said temples is substantially equivalent, and further comprising a computer system which manages the work of the electronic components so that an energy consumption of said temples is substantially equivalent.

10. The temples according to claim 9, wherein the temples are configured to accommodate at least one wireless transmission and/or reception means, said at least one wireless transmission and/or reception means allowing at least communication between said temples.

11. The temples according to claim 9, wherein the temples are capable of communicating with an external source device by said wireless transmission and/or reception means.

12. The temples according to claim 9, further comprising at least one microphone.

* * * * *